US006677942B1

United States Patent
Rushmeier et al.

(10) Patent No.: US 6,677,942 B1
(45) Date of Patent: Jan. 13, 2004

(54) METHOD AND APPARATUS FOR ACQUIRING NORMALS MAPS CONSISTENT WITH LOW SPATIAL RESOLUTION MESHES

(75) Inventors: Holly E. Rushmeier, Mount Kisco, NY (US); Fausto Bernardini, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 09/631,043

(22) Filed: Aug. 1, 2000

(51) Int. Cl.[7] .............................................. G06T 17/00

(52) U.S. Cl. ....................................... 345/420; 345/427
(58) Field of Search ................................. 345/420, 427

(56) References Cited

U.S. PATENT DOCUMENTS

| 5,715,166 | A |   | 2/1998  | Besl et al. ............. 364/474.24 |
|-----------|---|---|---------|-------------------------------------|
| 5,986,668 | A |   | 11/1999 | Szeliski et al. ............. 345/433 |
| 6,009,190 | A |   | 12/1999 | Szeliski et al. ............. 382/154 |
| 6,064,393 | A | * | 5/2000  | Lengyel et al. ............. 345/427 |
| 6,456,287 | B1| * | 9/2002  | Kamen et al. ............. 345/427 |
| 6,466,207 | B1| * | 10/2002 | Gortler et al. ............. 345/427 |

OTHER PUBLICATIONS

"Surface Reconstruction and Display from Range and Color Data" by Pulli, Dissertation submitted in partial fulfillment of the requirements for the degree of Doctor of Philosophy, University of Washington, 1997, pps. 1–117.

"Towards a General Multi–View Registration Technique" by Bergevin et al., IEEE Transactions on Pattern Analysis and Machine Intelligence, vol. 18, No. 5, May 1996, pps. 540–547.

"Object Modeling by Registration of Multiple Range Images" by Chen et al., Institute for Robotics and Intelligent Systems, Apr. 1991, pps. 2724–2729.

"A Method for Registration of 3–D Shapes" by Besl et al., IEEE Transactions on Pattern Analysis and Machine Intelligence, vol. 14, No. 2, Feb. 1992, pps. 239–256.

"A Computer–Assisted Range Image Registration System for Nuclear Waste Cleanup" by Gagnon et al., IEEE Transactions on Instrumentation and Measurement, vol. 48, No. 3, Jun. 1999, pps. 758–762.

"The Digital Michelangelo Projects: 3D Scanning of Large Statues" by Levoy et al. Proc. Siggraph, 2000, pps. 1–14.

"Multi–Feature Matching Algorithm for Free–Form 3D Surface Registration" by Schultz et al., Institute for Microtechnology, Neuchatel, Switzerland, 1998.

"Building Models From Sensor Data: An Application Shared by the Computer vision and the Computer Graphics Community" by Gerhard Roth, Visual Information Technology Group, National Research Council of Canada, pps. 1–9, undated.

(List continued on next page.)

*Primary Examiner*—Joseph Mancuso
*Assistant Examiner*—Adam Arnold
(74) *Attorney, Agent, or Firm*—Ohlandt, Greeley, Ruggiero & Perle, L.L.P.; Louis J. Percello

(57) ABSTRACT

A method, system and computer program for obtaining a digital model of an object. The method includes steps of (a) generating a low spatial resolution numerical representation of an object, such as a triangular mesh representation; (b) generating higher spatial resolution images of the object using a photometric subsystem, having a camera and a lighting source; and (c) computing normals maps using the low resolution numerical representation to estimate a distance from the camera to points on the object and to adjust relative light source intensities so as to correct for uncertainties in distances and light source intensities. A feature of this method is that the computed normals maps are made consistent over the object.

8 Claims, 15 Drawing Sheets

OTHER PUBLICATIONS

"Computing Consistent Normals and Colors from Photometric Data" by Rushmeier et al., IBM Thomas J. Watson Research Center, Oct. 1999.

"Acquisition and Visualization of Colored 3D Objects" by Abi–Rached et al., University of Washington, undated.

"Texturing 3D Models of Real World Objects from Multiple Unregistered Photographic Views" by Neuegebauer et al., Fraunhofer Institute for Computer Graphics, vol. 18, No. 3, 1999, pps. 245–256.

* cited by examiner $$\frac{\rho_p}{\pi} L_o \Delta\omega \begin{bmatrix} \ell_{1,x} & \ell_{2,x} & \ell_{3,x} \\ \ell_{1,y} & \ell_{2,y} & \ell_{3,y} \\ \ell_{1,z} & \ell_{2,z} & \ell_{3,z} \end{bmatrix} \begin{bmatrix} n_{p,x} \\ n_{p,y} \\ n_{p,z} \end{bmatrix} = \begin{bmatrix} \alpha L_{r,1,p} \\ \alpha L_{r,2,p} \\ \alpha L_{r,3,p} \end{bmatrix} \quad (1)$$

$$\rho_p d^2 \begin{bmatrix} \ell_{1,p,x} & \ell_{2,p,x} & \ell_{3,p,x} \\ \ell_{1,p,y} & \ell_{2,p,y} & \ell_{3,p,y} \\ \ell_{1,p,z} & \ell_{2,p,z} & \ell_{3,p,z} \end{bmatrix} \begin{bmatrix} n_{p,x} \\ n_{p,y} \\ n_{p,z} \end{bmatrix} = \begin{bmatrix} \alpha L_{r,1,p} r_{1,p}^2 / L_{o,1,p} \\ \alpha L_{r,2,p} r_{2,p}^2 / L_{o,2,p} \\ \alpha L_{r,3,p} r_{3,p}^2 / L_{o,3,p} \end{bmatrix} \quad (2)$$

$$\tilde{L}_{r,i,p} = (L_u d^2 / r_{i,p}^2) \ell_{i,p} \cdot n_p' \quad (3)$$

$$\alpha \bar{L}_{r,i,p} = \sum_{q}^{Q} \alpha L_{r,i,q} / |Q| \quad (4)$$

$$\alpha L_{r,i,q} = \rho_q \alpha L_{o,i,q} d^2 / r_{i,q}^2 \ell_{i,q} \cdot n_q \quad (5)$$

$$\alpha \bar{L}_{r,i,p} \simeq \rho_p \alpha L_{o,i,p} d^2 / r_{i,p}^2 \ell_{i,p} \cdot n_p' \quad (6)$$

$$\tilde{L}_{r,i,p} / \alpha \bar{L}_{r,i,p} \simeq L_u / \rho_p \alpha L_{o,i,p} \quad (7)$$

$$L_{o,i,p} \simeq \frac{L_u \alpha \bar{L}_{r,i,p}}{\rho_p \alpha \tilde{L}_{r,i,p}} \quad (8)$$

| FIG.2A |
|--------|
| FIG.2B |

FIG.2    FIG.2A $$\frac{L_u}{\alpha} d^2 \begin{bmatrix} \ell_{1,p,x} & \ell_{2,p,x} & \ell_{3,p,x} \\ \ell_{1,p,y} & \ell_{2,p,y} & \ell_{3,p,y} \\ \ell_{1,p,z} & \ell_{2,p,z} & \ell_{3,p,z} \end{bmatrix} \begin{bmatrix} n_{p,x} \\ n_{p,y} \\ n_{p,z} \end{bmatrix} =$$

$$\begin{bmatrix} \alpha L_{r,1,p} r_{1,p}^2 \tilde{L}_{r,1,p} / \alpha \overline{L}_{r,1,p} \\ \alpha L_{r,2,p} r_{2,p}^2 \tilde{L}_{r,2,p} / \alpha \overline{L}_{r,2,p} \\ \alpha L_{r,3,p} r_{3,p}^2 \tilde{L}_{r,3,p} / \alpha \overline{L}_{r,3,p} \end{bmatrix} \quad (9)$$

$$\alpha L_{r,i,p,c} = \int_0^\infty \rho(\lambda) L_{o,i,p}(\lambda) (d^2/r_{i,p}^2) \ell_{i,p} \cdot n_p S_c(\lambda) d\lambda \quad (10)$$

$$\rho_{rel,i,p,c} = \alpha L_{r,i,p,c} r_{i,p}^2 / \ell_{i,p} \cdot n_p \quad (11)$$

$$\rho_{ave,c} = \int_{\lambda_{c,min}}^{\lambda_{c,max}} \rho(\lambda)/(\lambda_{c,max} - \lambda_{c,min}) d\lambda \quad (12)$$

$$\rho_{rel,c,m} \beta_{c,m} - \rho_{rel,c,n} \beta_{c,n} = 0 \quad (13)$$

$$\sum_n^N \beta_{c,k} = N \quad (14)$$

FIG.2B

METHOD AND APPARATUS FOR ACQUIRING NORMALS MAPS CONSISTENT WITH LOW SPATIAL RESOLUTION MESHES

CROSS-REFERENCE TO A RELATED PATENT APPLICATION

This invention is related to copending U.S. patent application Ser. No. 09/629,673, filed on even date herewith, entitled "Method and Apparatus for Acquiring a Set of Consistent Image Maps to Represent the Color of the Surface of an Object" by Holly E. Rushmeier and Fausto Bernardini.

FIELD OF THE INVENTION

This invention relates generally to methods and apparatus for processing image data and, more particularly, relates to methods and apparatus for computing surface normals from a plurality of sets of photometric data.

BACKGROUND OF THE INVENTION

The creation of three-dimensional digital content by scanning real objects has become common practice in graphics applications for which visual quality is paramount, such as animation, e-commerce, and virtual museums. A significant amount of attention has been devoted to the problem of accurately capturing the geometry of scanned objects.

Three-dimensional scanners are used increasingly to capture digital models of objects for animation, virtual reality, and e-commerce applications for which the central concerns are efficient representation for interactivity and high visual quality.

Most high-end 3D scanners sample the surface of the target object at a very high resolution. Hence, models created from the scanned data are often over-tesselated, and require significant simplification before they can be used for visualization or modeling.

In general, a variety of techniques can be used to capture digital models of physical objects, including CAT scans and structure from motion applied to video sequences. The following description has been restricted for convenience to techniques involving instruments that capture range images (in which each pixel value represents depth) and intensity images (in which each pixel is proportional to the incident light). A detailed summary of such methods can be found in G. Roth, "Building models from sensor data:an application shared by the computer vision and computer graphics community", In Proc. of the NATO Workshop on the Confluence of Computer Vision and Computer Graphics, 2000.

The basic operations necessary to create a digital model from a series of captured images are as follows. After outliers are removed from the range images, they are in the form of individual height-field meshes. A first step aligns these meshes into a single global coordinate system. In high-end systems registration may be performed by accurate tracking. For instance, the scanner may be attached to a coordinate measurement machine that tracks its position and orientation with a high degree of accuracy. In less expensive systems an initial registration is found by scanning on a turntable, manual alignment, or approximate feature matching. The alignment is then refined automatically using techniques such as the Iterative Closest Point (ICP) algorithm of Besl and McKay.

After registration, scans do not form a single surface, but interpenetrate one another, due to acquisition errors primarily along the line-of-sight in each scan. To form a single surface, in a next step overlapping scans are averaged. In stitching/zippering methods this averaging is performed between pairs of overlapping meshes. In volumetric/occupancy grid methods line-of-sight errors are averaged by letting all scanned points contribute to a function of surface probability defined on a single volume grid. An advantage of volumetric methods is that all scans representing a surface point influence the final result, rather than simply a pair of scans.

In this step the scans are integrated into a single mesh. The integration may be performed by zippering/stitching, isosurface extraction from volumes, or interpolating mesh algorithms applied to error-corrected points.

If a texture map is to be used with the integrated mesh, in a next step the surface is parameterized with respect to a 2D coordinate system and texture coordinates are interpolated between mesh vertices. A simple parameterization is to treat each triangle separately and to pack all of the individual texture maps into a larger texture image. However, the use of mip-mapping in this case is limited since adjacent pixels in the texture may not correspond to adjacent points on the geometry. Another approach is to locate patches of geometry which are height fields that can be parameterized by projecting the patch onto a plane. Stitching methods use this approach by simply considering sections of the scanned height fields as patches. Other methods could be built on tiling methods developed for multiresolution analysis or interactive texture mapping.

Parallel to acquiring the geometry of the model, intensity images are captured to obtain information about the reflectance of the surface. Such images may be recorded with electronic or traditional cameras, or by using polychromatic laser technology. In a next step these images are aligned to the corresponding geometry. In some cases the image acquisition is decoupled from the geometry acquisition. The camera intrinsic and extrinsic parameters for the images are estimated by manual or automatic feature matching. The advantage is that acquisition modalities that cannot capture surface reflectance can be used for capturing geometry.

In most cases, however, the alignment is performed by calibration. Geometry and intensity are captured simultaneously from scanners with a measured transformation between sensing devices. The resolution of the intensity image may be the same as that of the range image or even higher.

One benefit of obtaining intensity and range images simultaneously is that the intensity information can be used in the registration process in the first step described above. Various approaches have been developed to use intensity images in registration. For example, it is known to use color as an additional coordinate in the ICP optimization. This avoids local minima in the solution in areas that have no geometric features, but have significant variations in the intensity. For models with pronounced geometric and intensity features, the method has proven to be very effective. A drawback is having to combine position and color data with different ranges and error characteristics. For subtle feature variations, these can cause one type of data to erroneously overwhelm the other.

It is also known to use intensity images to avoid the spatial search required by ICP. Intensity and intensity gradient images from approximately aligned scans are transformed into a common camera view. Locations of corresponding points on overlapping scans are inferred based on the difference between intensity values at a given pixel and the gradient at that pixel. This method works well only if the spatial variation of the gradient is small relative to errors in the alignment of the scans.

It is also known to employ a non-ICP method for using intensity images to refine an initial manual alignment. In this approach pairs of range images are aligned manually by marking three points on overlapping intensity images. The locations of the matching points are refined by searching their immediate neighborhoods with image cross-correlation. A least-squares optimization follows to determine a general 3D transformation that minimizes the distances between the point pairs.

Image registration techniques are also used for image mosaics in which only rotations or translations are considered.

After the intensity images are aligned to the geometry, illumination invariant maps are computed to estimate the surface reflectance. The number of scans versus the number of intensity images, as well as the resolution of the scans compared to the resolution of the images are considered at this stage. For a small number of scans and a large number of intensity images obtained under calibrated lighting conditions, a full Bidirectional Reflectance Distribution Function (BRDF) can be estimated.

If many scans are required to represent an object, and only a few high-resolution intensity images are captured per scan, photometric stereo techniques can be used to estimate Lambertian reflectance. Alternatively, if the range and intensity images have the same resolution, the geometry can be used to compute reflectance from a single image.

Problems arise when it is desired to employ a low complexity, low cost image capture system. In such a system variations in lighting and positioning result in slight but discernible variations in photometric results from mesh to mesh. This can result in the generation of surface normal maps that are inaccurate.

More particularly, high spatial frequency detail in the object model can be represented by normals maps, which are arrays of data in which each entry is a vector representing surface orientation. Low spatial frequency models of objects can be obtained using inexpensive camera-based systems, while high spatial frequency details in the form of normals maps can be obtained using photometric stereo. However, many maps are required to cover the surface of a typical object, and uncertainties in the physical parameters of the photometric stereo system result in normals maps which are not consistent with one another. As a result, when the normals maps are combined into a single representation of the object visible artifacts are apparent in the seams between the maps.

Based on the foregoing, it can be readily appreciated that a need exists for improved methods to construct accurate digital models of multi-scanned objects, in particular digital models that exhibit high-quality surface normals, and that eliminate visible artifacts that appear in the object model.

OBJECTS AND ADVANTAGES OF THE INVENTION

It is a first object and advantage of this invention to provide an improved method and system for constructing accurate digital models of multi-scanned objects, in particular digital models that exhibit high-quality surface normals.

It is a further object and advantage of this invention to provide a method and system for computing surface normals from multiple sets of photometric data, that are consistent with each other and with an underlying lower resolution mesh.

It is another object and advantage of this invention to provide a method and system wherein surface normals are computed by locally adjusting light source intensities using data from the underlying mesh.

It is one further object and advantage of this invention to provide a hybrid multiview/photometric method and system for scanning objects, wherein a base geometric model is obtained, and wherein a photometric system is used to obtain surface normals at a higher spatial resolution than the underlying base geometric model, where the surface normals are computed such that the results are consistent over the object, and also with the underlying base geometric model.

SUMMARY OF THE INVENTION

The foregoing and other problems are overcome and the objects and advantages of the invention are realized by methods and apparatus in accordance with embodiments of this invention.

A method is disclosed for computing normals from multiple sets of photometric data, that are consistent with each other and an underlying lower resolution mesh. Normals are computed by locally adjusting light source intensities using data from the underlying mesh.

This invention pertains generally to scanning objects that are large relative to a smallest geometric level of detail to be represented. Three dimensional models of the objects are obtained by combining the results of a number (e.g., hundreds) of individual scans. The inventors have developed a hybrid multiview/photometric method for scanning such objects. A multiview light striping system is used to obtain a base geometric model, and a photometric system is used to obtain surface normals at a higher spatial resolution than the underlying geometric model. This invention provides a technique for computing the normals so that the results are consistent over the object, and also with the underlying base geometry.

The teachings of this invention employ a low spatial resolution numerical representation of an object, such as one in the form of a triangular mesh, and combines information from the low spatial resolution mesh representation with images from the photometric system. The normals computed using the low spatial resolution mesh representation are consistent with the low spatial resolution mesh representation, and are thus consistent with one another. The low resolution representation is used to estimate the distance from the camera used to produce the photometric images, and is also used to adjust the relative light source intensities in the photometric system. Using the low resolution mesh representation, uncertainties in the parameters of the photometric system, specifically distances and light source intensities, are thereby corrected.

BRIEF DESCRIPTION OF THE DRAWINGS

The above set forth and other features of the invention are made more apparent in the ensuing Detailed Description of the Invention when read in conjunction with the attached Drawings, wherein:

FIG. 2 illustrates various mathematical equations that are referred to in the description of the invention;

FIG. 4A depicts a two dimensional system used to evaluate the validity of assumptions made in computing surface normals, while

DETAILED DESCRIPTION OF THE INVENTION

Figure 1A:
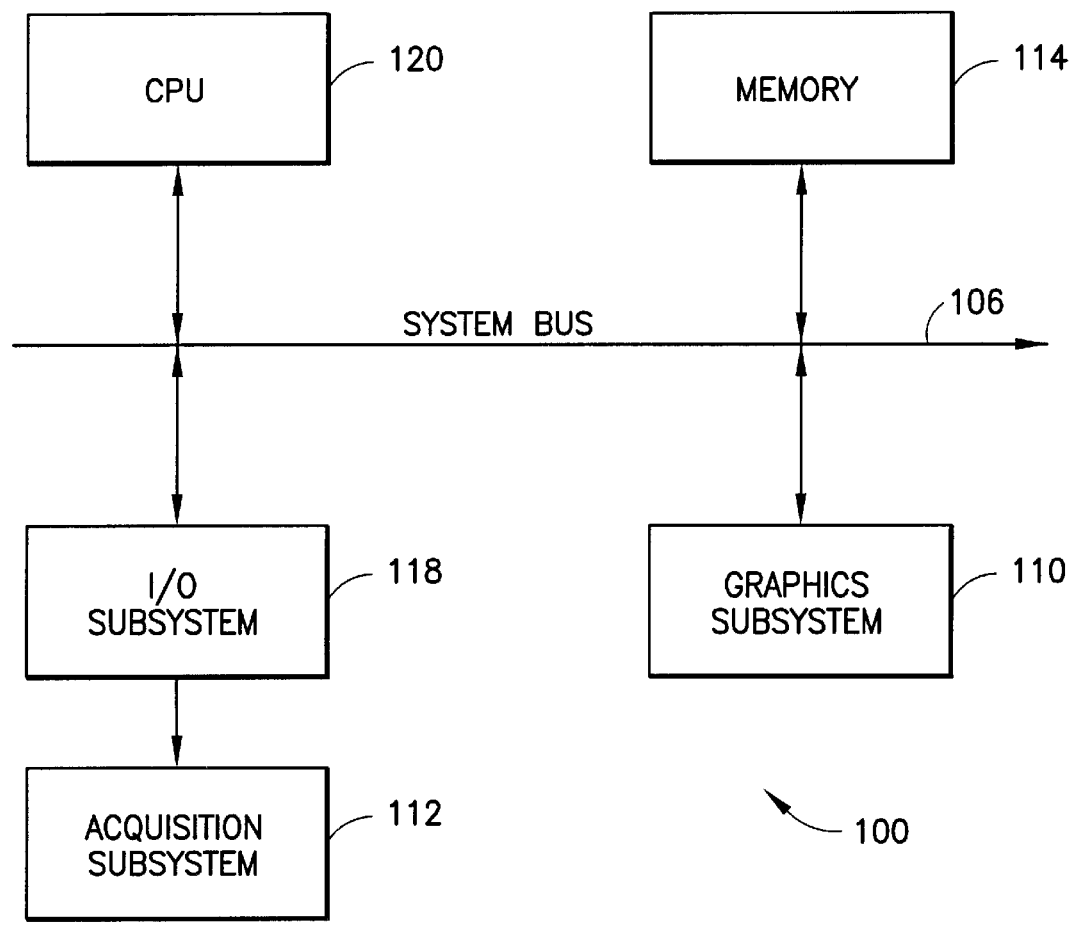
FIG. 1A is a block diagram of a computer system with graphics and 3D data acquisition capabilities that is suitable for practicing this invention.

FIG. 1A is a block diagram of a computer system 100 with a graphics subsystem 110 and 3D data acquisition (photometric) subsystem 112 that is suitable for practicing this invention. A system bus 106 interconnects a CPU 120 (such as a Pentium™-type microprocessor) with the graphics subsystem 110 and a system memory 114. The acquisition subsystem 112 is preferably, but not necessarily, interfaced through an I/O subsystem 118.

It can be appreciated that the memory 114 can include or be loaded from a computer readable medium that embodies a computer program for constructing or obtaining a digital model of an object in accordance with the teachings herein, in particular a computer program for constructing detailed normals maps.

More particularly, the computer program that is embodied on the computer readable medium has instructions for implementing a method for obtaining a digital model of an object. This method includes steps of (a) generating a low spatial resolution numerical representation of an object, such as a triangular mesh representation; (b) generating higher spatial resolution images of the object using the photometric subsystem 112, having a camera 112b and a lighting source 112a; and (c) computing normals maps using the low resolution numerical representation to estimate a distance from the camera to points on the object and to adjust relative light source intensities so as to correct for uncertainties in distances and light source intensities. A feature of this method is that the computed normals maps are made consistent over the object.

Figure 1B:
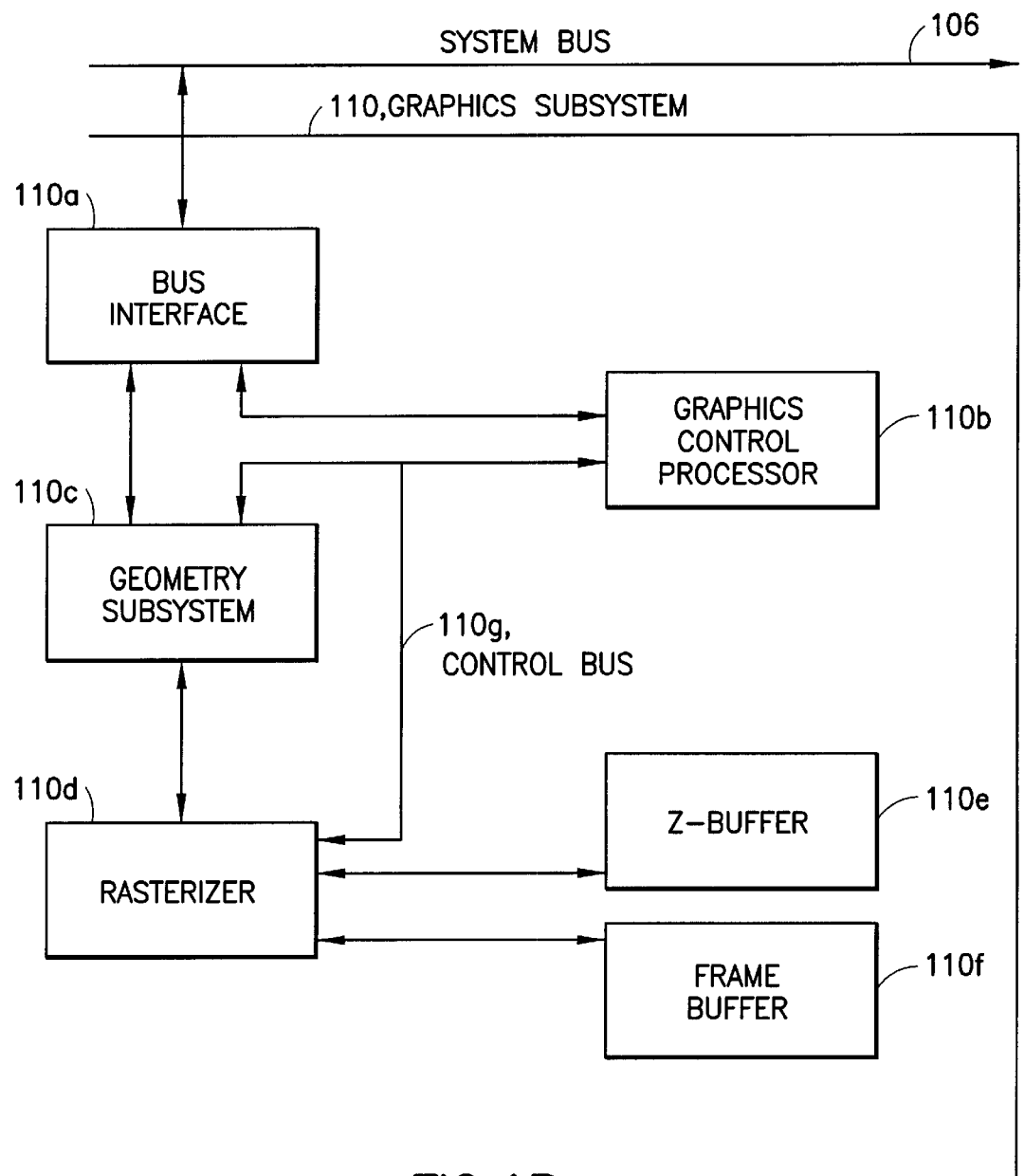
FIG. 1B shows the graphics subsystem in greater detail.

FIG. 1B shows the graphics subsystem 110 in greater detail. A bus interface 110a connects the system bus 106 to a graphics control processor 110b and to a geometry subsystem 110c. A graphics control processor 110b control bus 110g also connects to the geometry subsystem 110c and to a rasterizer 110d. A depth or z-buffer 110e and a frame buffer 110f are also typically coupled to the rasterizer 110d, and cooperate to render the object models for display.

Figure 1C:
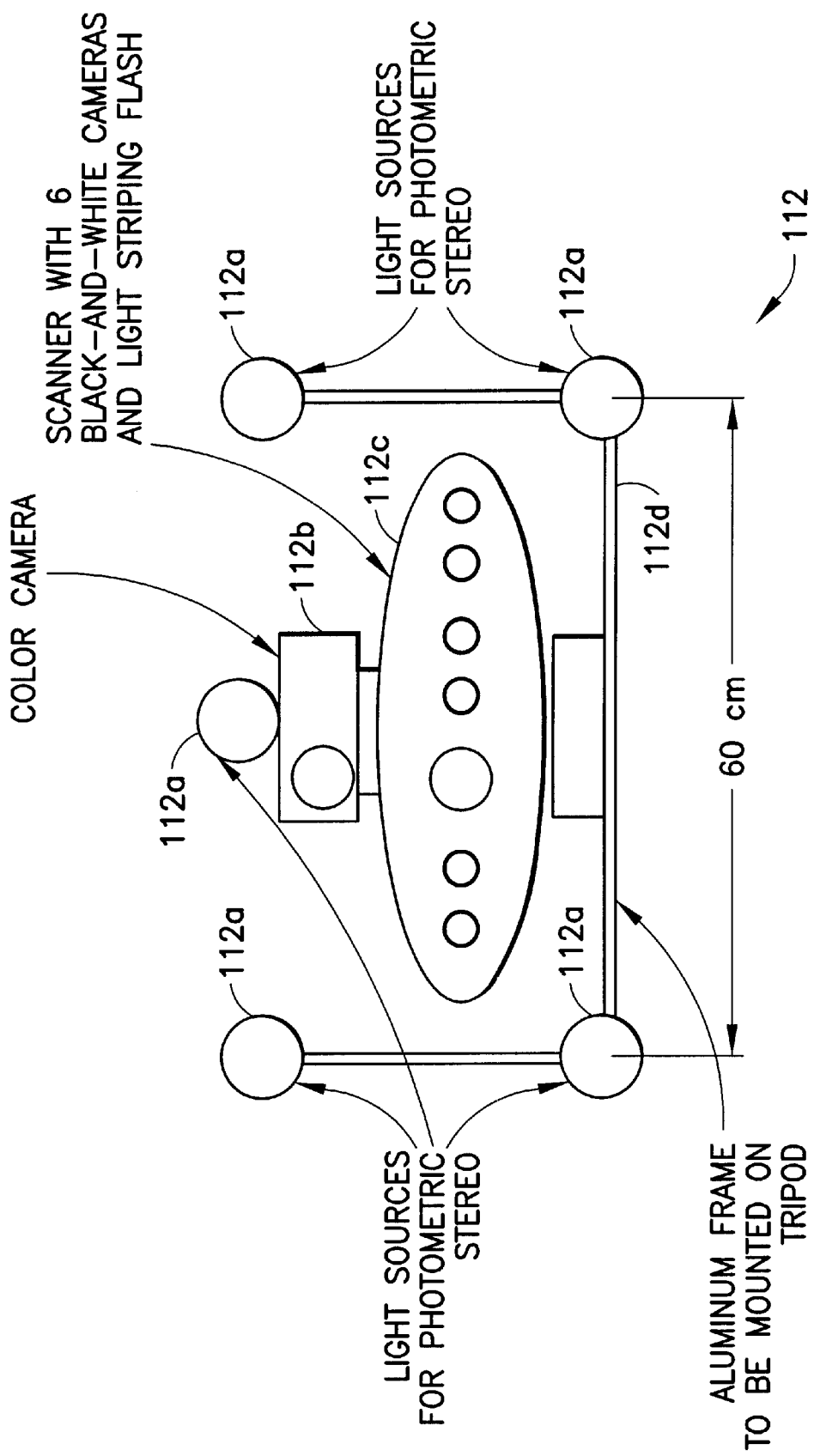
FIG. 1C depicts the 3D data acquisition system in greater detail.

FIG. 1C depicts in greater detail a presently preferred low complexity and low cost 3D data acquisition system 112. A tripod-mounted frame 112d supports a plurality (5) of light sources 112a used for photometric stereo imaging. A suitable total width of the frame 112d and the supported light sources 112a can be 60 cm. Also supported by the frame 112d is a color camera 112b and a scanner 112c with, for example, six black and white cameras and a light striping flash. Reference in this regard can also be had to FIG. 3 of H. Rushmeier et al., Acquiring Input for Rendering at Appropriate Levels of Detail: Digitizing a Pieta" in Rendering Techniques '98, Eds. G. Drettakis and N. Max, Springer, Wien, pp. 81–92, 1998.

Figure 1D:
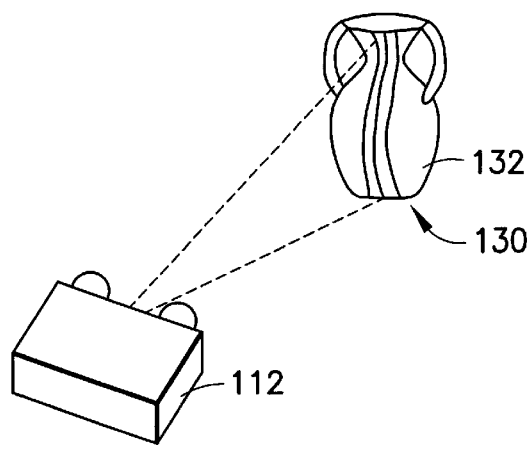
FIG. 1D is an example of the operation of the 3D scanner.

In operation, and referring now as well to FIG. 1D, a light striping flash projects a set of stripes of light (structured light) 130 onto an object 132 (such as the vase depicted previously). The digital cameras of scanner 112C capture the shape of the stripes 130 from different angles. Digital image processing techniques are then used to compute the distance of each pixel on each stripe with respect to the sensor (cameras).

Figure 1E:
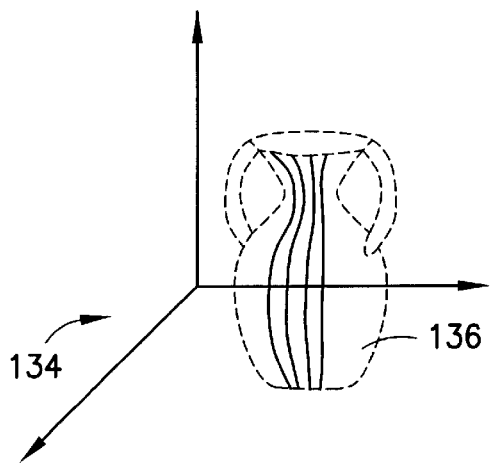
FIG. 1E shows the result of acquiring multiple stripes.

For all but the simplest objects 132, this process is repeated from multiple viewpoints, so that the sensor can "see" every portion of the object's surface. The multiple scans are then registered, or aligned, into a single coordinate frame 134 shown in FIG. 1E. The measured points 136 can be seen as an unorganized "point cloud".

Figure 1F:
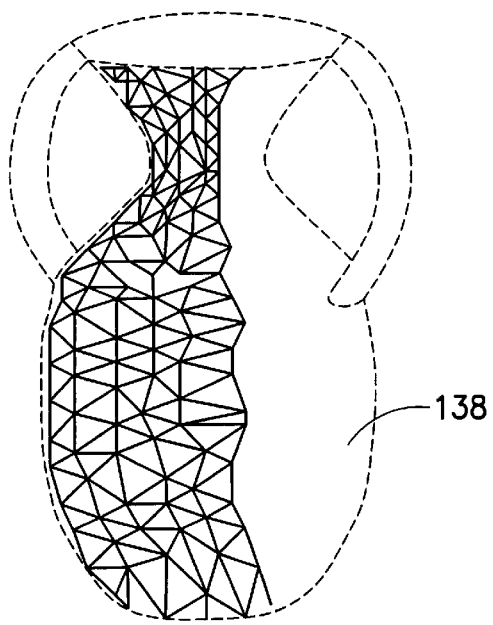
FIG. 1F shows, in the scan integration phase, the computation of a triangular mesh.
Figure 1G:
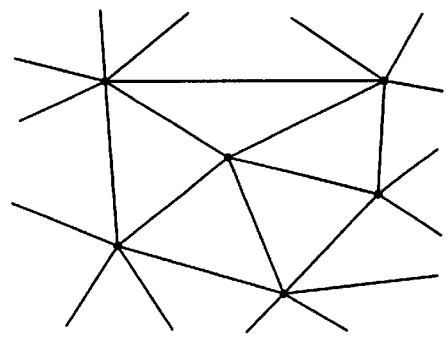
FIG. 1G shows a closeup view of the computed triangular mesh.

Next, in FIG. 1F, a scan integration phase forms a triangular mesh 138 that connects the measured points. The result of this operation is a 3D geometric model of the surface of the object 132. In subsequent operations, the mesh can be simplified, texture maps can be applied, or the triangular mesh can be converted to a curved surface representation (e.g., NURBS). FIG. 1G shows a closeup view of the computed triangular mesh of FIG. 1F.

The acquisition system 112 allows the capture of five images with each of the five lights turned on in sequence, registered to the geometry acquired by the shape camera. Each geometric mesh has a resolution of approximately 2 mm, and an estimated sub-millimeter accuracy. A set of normals are computed from the five photometric images at a resolution of between 0.5 and 1 m.

Variations in lighting and positioning result in slight but discernible variations in the photometric results from mesh to mesh. In the ensuing description a discussion is made of a technique to correct these variations. The normals maps are made consistent with the underlying mesh by locally adjusting the light source intensities used in the calculations, using data from the underlying mesh. By using a consistent global underlying mesh computed by registering and remeshing the underlying base meshes, the normals maps are consistent with one another, as well as with the global mesh. Corrected red, green and blue maps can also be computed from the photometric data. Chromatic variations from map to map are corrected with a global color registration that is analogous to a global geometric registration used to obtain the global base mesh.

Figure 3:
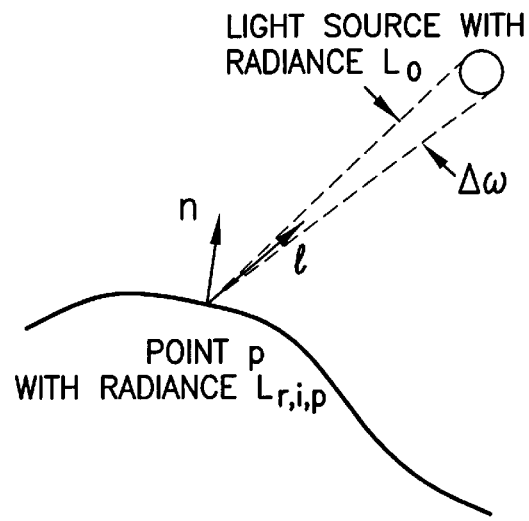
FIG. 3 is a diagram useful in understanding the geometry of light reflectance used in Eq. (1) of FIG. 2.

The photometric stereo method for computing three dimensional shapes was originally developed by Woodham (B. K. P. Horn and M. J. Brooks, Shape from Shading, MIT Press, 1989). The essence of the method is to take a series of images from the same camera view, each with lighting from a different, known, direction. Assuming an approximately Lambertian bidirectional reflectance distribution function (BRDF) and identical light sources, the relative reflectance and normal at each pixel location can be computed from three images. Specifically, the set of equations shown in Equation (1) of FIG. 2 are solved, where $\rho_p/\pi$ is the BRDF at pixel p, $L_o$ is the light source radiance, $L_{r,i,p}$ is the radiance reflected from the point visible through pixel p in image i, $\Delta\omega$ is the solid angle subtended by the light source, $n_p$ is the surface normal at p and $l_i$ is the direction vector to the (infinitely distant) i-th light source. The constant $\alpha$ accounts for the camera scaling of the reflected radiance to a value from 0 to 255, after the images are adjusted if necessary for gamma values other than 1. The equations can be solved directly for $(\rho_p L_o \Delta\omega/\alpha\pi)n_p$. Since the magnitude of $n_p$ is one, from this result one can obtain the normal vector $n_p$ and a value $\rho_{rel,p} = \rho_p L_o \Delta\omega/\alpha\pi$, that is, the reflectance at pixel p relative to the other pixels in the image. FIG. 3 is useful in understanding the geometry of light reflectance used in Eq. (1).

Two difficulties with this approach are the presence of a highly specular component in the BRDF of the surface being measured, as well as shadows. Following the approach used by other researchers (e.g. see R. Epstein et al., Learning object representations from lighting variations, ECCV 96 International Workshop, pages 179–199, April 1996) one obtains extra images from additional light source positions. For each pixel location, the intensity values from the source images are sorted. Very high relative values are not used to exclude specular reflections, and low relative values are not used to exclude shadows. It is preferred to use relative value only, rather than color, to distinguish possible specular reflection, since there may be spectrally flat regions in the object, in this example a statue, for which such methods would fail. It is preferred to not use in the computations that follow those pixel locations where fewer than three images have pixel values that fall in the valid range. This is not, however, a limitation upon the practice of these teachings.

In the presently preferred embodiment a system of five lights 112a is used, providing two redundant reflectance measurements per pixel location. This number was used because it allowed a set of lights with a significant physical separation, while keeping to an overall manageable size for mounting on a tripod. FIG. 1C, described previously, illustrates the presently preferred embodiment of the image acquisition system 112. In other embodiments more or less lights could be used, and the spacing between lights may be different.

In a controlled environment, the term $L_o$ can be made the same for each source for all points on the scanned target by using controlled, identical, isotropic light sources. The term $\Delta\omega$ can be made constant for all points and all sources by placing the sources at a distance from the target that is large relative to the sizes of the light sources and the target.

In an inexpensive image capture system used in an environment such as a museum, any number of variations in light source radiances and position can occur:

The light sources 112a may not be identical. The radiance from individual bulbs of the same type will vary slightly, particularly for inexpensive off-the-shelf bulbs.

The light sources 112a may not be isotropic. In the instant case halogen bulbs were used for their brightness and ease of use. The emitted radiance is approximately uniform in a 30 degree cone around the direction that the source is aimed. There are small variations across the scanned area, and small disturbances caused slight changes in the source direction.

The light sources 112a may vary over time. The emittance radiance varies with the age of the bulb. It also varies with each use as a function of time since the bulb was turned on.

The light source 112a radiance varies with the electrical power level. A regulated power supply is required to maintain a consistent source level.

The distance from the light sources 112a to the area being scanned varies across the object. Requiring the distance to the light sources to be large relative to the scanned area would result in very small areas being scanned in each shot to obtain the spatial resolution required.

As well as overall strength, the light source 112a spectrum varies from bulb to bulb, with time and with level of power input.

All of these factors can be treated by high precision characterization and control of the lighting system, and by restricting the spatial extent of data acquired for each set of photometric images. However, such precision adds greatly to the cost of the system, and to the time required to acquire the data for the full object, such as a piece of sculpture. Instead, the inventors have dealt with these problems by exploiting the existence of the underlying, lower resolution mesh, and by performing a global registration of results.

Because of the foregoing variations from an ideal photometric setting, a method was developed to solve the system in Eq. (1) expressed with variable light source radiances and solid angles. It was assumed that the radius of the light sources 112a is the same for all the sources, and that d is small (i.e. less that 10 percent) relative to the distance $r_{i,p}$ from surface point p to each light source i so that the solid angle $\Delta\omega_i$ for each source can be approximated by $\pi d^2/r^{2i,p}$. One may denote the radiance of light source i at pixel location p with $L_{o,i,p}$. Eq. (1) can then be rewritten as Equation (2) in FIG. 2. All of the quantities in Eq. (2), except for $\alpha$ and d, vary from pixel to pixel across the image.

Using the system in accordance with these teachings, one obtains a geometric mesh at a spatial resolution of approximately 2 mm registered with each set of five photometric images obtained. The individual meshes are registered to one another using a two pass method that first uses a set of laser dots projected onto the object being scanned for an initial alignment, and then a form of the above referenced Iterative Closest Point (ICP) technique can be employed for a final more precise registration (see, e.g. R. Bergevin et al., Towards a general multi-view registration technique, IEEE Trans. on Pattern Alaysis and Machine Intelligence, 18(5) :540–547, May 1996). The meshes are combined into one single mesh using, preferably, a Ball-Pivoting Algorithm described by F. Bernardini, Joshua Mittleman, Holly Rushmeier, Claudio Silva and Gabriel Taubin, The Ball-Pivoting Algorithm for Surface Reconstruction, IEEE Trans. on Visualization and Computer Graphics, 5(4): 349–359, October–December 1999, which is incorporated by reference herein in its entirety, as is copending U.S. patent application Ser. No. 09/549,432, filed Apr. 14, 2000, entitled Method and Apparatus for Reconstructing a Surface Using a Ball-Pivoting Algorithm.

In general, the Ball-Pivoting Algorithm (BPA) computes a triangle mesh interpolating a given point cloud. Typically the points are surface samples acquired with multiple range scans of an object. The principle of the BPA is as follows: three points form a triangle if a ball of a user-specified radius touches them without containing any other point. Starting with a seed triangle, the ball pivots around an edge, that is, it revolves around the edge while keeping in contact with the edge's endpoints until it touches another point, forming another triangle. The process continues until all reachable edges have been tried, and then starts from another seed triangle, until all points have been considered.

For each set of photometric images there is obtained a consistent underlying mesh, and a camera transformation that gives the camera parameters for the photometric image capture in terms of a global coordinate system. Given these data, one can readily compute the following for each pixel of the photometric images:

The distances $r_{i,p}$ from the visible surface point p to each of the light sources i. While there may be some error in this distance approximation, the error is well under one percent over the typical 0.75 meter distance from the surface of the object to the camera 112c.

The direction $l_{i,p}$ from the visible surface point to each light source 112a.

An approximate surface normal $n'_p$ at the visible point computed from the lower resolution surface.

One can immediately use the underlying values of $l_{i,p}$ and $r_{i,p}$ as good estimates for the values in Eq. (2). However, a need remains to find estimates for the relative values of $L_{o,i,p}$ that account for the temporal, directional and bulb to bulb variations of the light sources 112a. To do this, it is preferred to equate the relative reflected radiances from the underlying surface illuminated by ideal sources, to the relative image radiances in the neighborhood of the pixel.

Consider ideal light sources with uniform radiances $L_u$ in the same positions as the physical light sources 112a. If these ideal sources illuminated the underlying base surface coated with a Lambertian reflectance of 1, the reflected radiances would be as shown in Equation (3) of FIG. 2. Eq. (3) may be considered to enable the generation of a synthetic image defining light reflected from the low resolution mesh for each grey scale image corresponding to a different lighting condition. The entire synthetic image need not be calculated at once, as the synthetic image can be calculated pixel-by-pixel, on the fly, as it is needed.

For the i-th photometric image, the reflected radiance in the neighborhood around pixel p is shown in Equation (4) of FIG. 2, where a consideration is made of a neighborhood of pixels Q that approximately represents the area on the surface of a disk with a radius equal to the base geometry resolution. In the preferred, but not limiting, system the base resolution is 2 mm, corresponding to a radius of 5 pixels. Notice that from the images, $L_{r,i,p}$ is not obtained directly, but instead the quantity $\alpha L_{r,i,p}$ as recorded by the camera 112c. Reference in this regard may be had to FIG. 7C, discussed below, which shows blurred images produced by an averaging process.

The values $\alpha L_{r,i,p}$ are the result of recording the reflection from the true physical sources in accordance with Equation (5) in FIG. 2.

An assumption is made that although $\rho_p$, $L_{o,i,p}$, $r_{i,p}$, and $l_{i,p}$ vary pixel by pixel over the entire image, they vary relatively little in the small neighborhood around pixel p. An assumption is also made that the average over Q of the dot products $l_{i,q} \cdot n_q$ is approximately equal to the dot product of $l_p$ and the underlying surface normal $n'_p$. Note that these assumptions are the same basic assumptions made in all photometric stereo calculations, with the exception that the assumptions are made in a (small) region of pixels rather than for just the surface represented by a single pixel. With these assumptions one has the relationship shown in Equation (6) of FIG. 2. Equation (7) then shows the ratio of the radiance reflected from the underlying (low resolution) surface given in Eq. (3) to the average recorded radiance in the pixel neighborhood given in Eq. (6). Eq. (7) can be used to express the unknown source radiances in terms of quantities that can be computed, or which are the same for all light source directions, as shown in Equation (8) of FIG. 2. Using Eq. (8) in the right hand side of Eq. (2), and simplifying terms, results in Equation (9) of FIG. 2.

The values of $\alpha$ have been retained in Eq. (9) since the quantities are the values actually available from the recorded images. Eq. (9) can be solved for a vector in the direction of the surface normal, and normalization gives the result $n_p$. The effect of the surface reflectance $\rho_p$ is in both the individual pixel values and the averaged pixel values. As a result the reflectance term is canceled out of the equation, and the length of the vector in the direction of the surface normal no longer has a useful physical interpretation.

The accuracy of the resulting normals depends on the validity of the assumptions made in the approximation in Eq. (6). The small size of the neighborhood used for averaging relative to the distance to the camera 112c (e.g., 2 mm versus 750 mm in this example), justifies the assumptions that $L_{o,i,p}$, $r_{i,p}$, and $l_{i,p}$ are uniform. The reflectance is also reasonably assumed to be uniform in a small neighborhood. Exceptions to this are abrupt changes due to, for example, a change in surface coating of the object being scanned. However, it has been found that changes in reflectance cause a consistent change in all of the photometric images and can be detected. That is, a sharp increase in reflectance results in an increase in reflected radiance for all light source directions. The main assumption is the equivalence of the average of the dot product of the light direction and the normals on the high resolution surface and the dot product of the light direction with the normal of the underlying lower resolution surface.

Figure 4A:
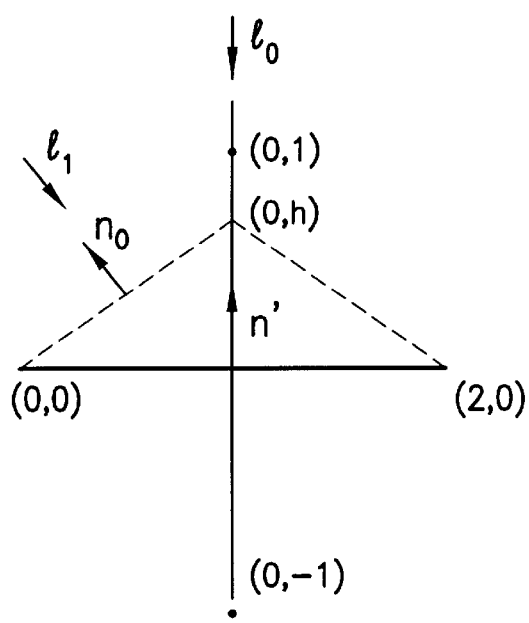
Figure 4B:
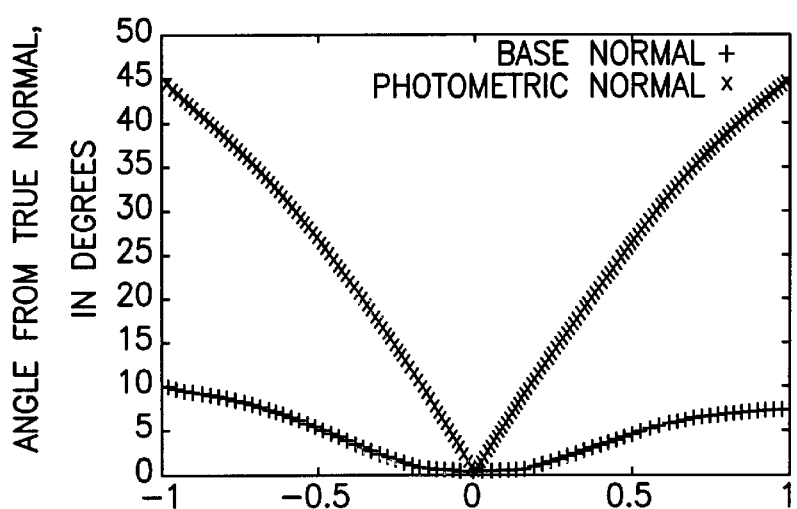
FIG. 4B shows the results of applying the method for surface normals computation.

FIG. 4A depicts the two dimensional system used to evaluate the validity of assumptions made in computing the normals, while FIG. 4B shows the results of applying the method for normals computation.

To evaluate the assumption of equating the average and single dot products consider the simple two dimensional system shown in FIG. 4A. Consider a horizontal surface, of width 2, that is approximated by the low resolution surface connecting the points (0,0) and (2,0). The surface is illuminated by two lights: $l_o$ in direction (0,1), and $l_1$ in direction (−(sqrt 2)/2, (sqrt 2)/2). One can then apply the foregoing calculation method to a higher resolution surface that has two facets formed by a displacement h in the center of the surface. By examining the accuracy of the result one obtains the normal of the left facet as a function of h.

Specifically, the following quantities are computed:

The underlying surface normal n'=(0,1) for all h. The true facets normals
and $$n_o = \frac{(-h, 1)}{\sqrt{1+h^2}}$$

$$n_1 = \frac{(h, 1)}{\sqrt{1+h^2}}$$

The reflected light for each facet for each light, $L_{r,i,j} = l_i \cdot n_j$; and The approximate surface normal from Eq. (9), using $$\bar{L}_{r,i} = L_{r,i,0} + L_{r,i,1}$$

and $$\bar{L}_{r,i} = l_i' n'$$

and setting the constant factor to one.

The results of these calculations are shown in FIG. 4B. The plot compares the angle between the estimated and true normal from using the underlying surface normal, and from using the approximate normal from the photometric method. The non-linearity of the dot products with normal vectors accounts for the errors in the photometric method, and for the asymmetry between negative and positive values for h. Although the error in the photometric method increases with the absolute value of h, the photometric estimate of the normal is in all the cases a significant improvement over using the underlying normal.

The above calculations do not account for interreflections that would occur when h is negative. In the exemplary application where the object was a statue, the measurement was made on a surface with low reflectance and, as a result, there is relatively little indirect illumination from interreflections. For surfaces with high reflectance and steep slopes in the high resolution surface there would be additional error in the computed normals.

Although not pertaining directly to the teachings of this particular invention, a discussion is now made of color calculations. Further details of the color calculation process can be found in the above-referenced copending U.S. patent application Ser. No. 09/629,673, filed on even date herewith, entitled "Method and Apparatus for Acquiring a Set of Consistent Image Maps to Represent the Color of the Surface of an Object" by Holly E. Rushmeier and Fausto Bernardini.

Given an estimate of the surface normal at each pixel, one may compute versions of the photometric input images with the shading effects due to the directional lighting removed. By taking a weighted average of these corrected images, one obtains an estimate of reflectances in the red, green and blue color channels. Unlike scans with a polychromatic laser, one does not obtain the absolute value of the reflectance in each channel, or a precise spectral definition of each channel. However, using some additional spot measurements of spectral reflectance one can adjust the corrected images to approximate absolute reflectance in defined spectral ranges. The adjustment of specific corrected images by the spot measurements is propagated over all images by a global color registration process.

Denoting the wavelength of light as $\lambda$ and using the subscript C to denote the color channel that is either red, green or blue, the recorded color value $\alpha L_{r,i,p,C}$ of each pixel p in each photometric image i is given by Equation (10) shown in FIG. 2, where $S_C(\lambda)$ is the spectral sensitivity of the color camera 112b in channel C.

Using the normals as described above, a next step computes an approximate relative reflectance $\rho_{rel}$ for each channel using Equation (11) shown in FIG. 2. This reflectance is relative to other pixels in the same channel in the same image. As in the case of the calculation of normals, it is preferred to not use high or low pixel values to avoid using data in areas of specular reflection and shadow. However, unlike the normals calculations, one does not meed a pixel estimate from three images to estimate the relative reflectance. Since one can afford to use less of the image, it is possible to avoid including the effects of directionally varying light source intensity by only using pixels that fall in a small cone around the direction in which the light source 112a is aimed.

The five relative reflectance images computed with Eq. 11 are adjusted relative to one another to compensate for variations in light source strength. The pixels for which all five of the images have non-zero values are found, and the averages for these overlapping pixels are computed. The overall level of the images is adjusted by making all of the average values equal.

Once the images levels are adjusted, the five images are combined with a weighted average to produce a single corrected RGB image for the position of camera 112c. The weight assigned to each pixel in each image increases with distance to the nearest black edge in the image. This weighting is preferred in order to avoid small but sudden changes at edges where each photometric image stops contributing to the combined average.

Figure 5A:
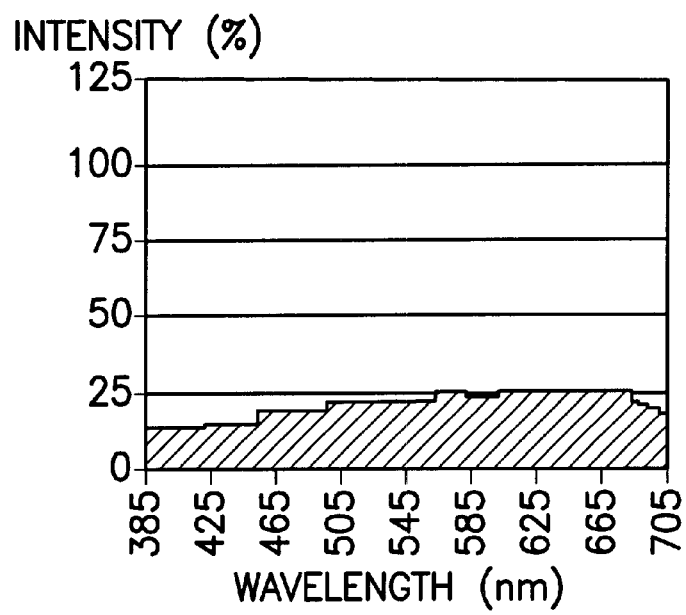
FIGS. 5A and 5B illustrate two typical spectra measured on a test object (sculpture), wherein intensity is plotted versus wavelength.
Figure 5B:
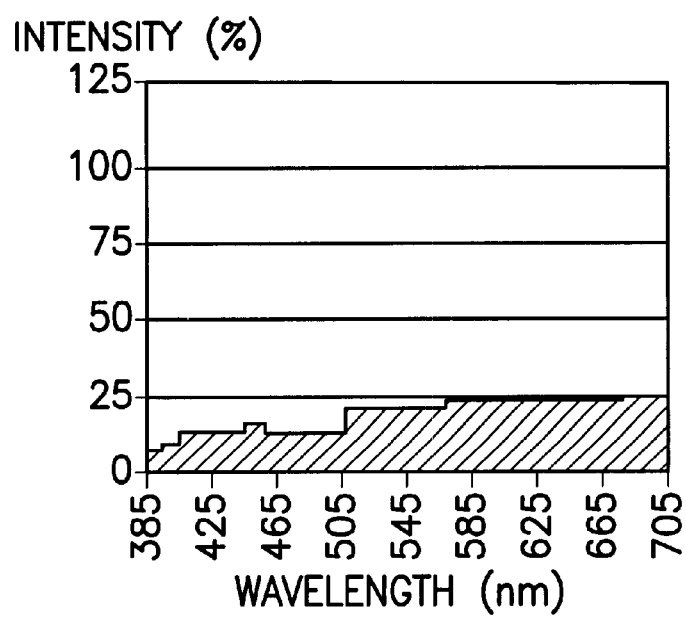

Clearly the relative reflectances computed from Eq. 11 are not scaled to the actual percentage of visible light that would be reflected. The images also still contain the effects of the light source spectra and the color camera 112b spectral sensitivity. Furthermore, the red, green and blue channels are not defined in terms of wavelengths. To deal with these factors, separate spot measurements are made of spectral reflectance using a Colortron color ruler (Light Source, Inc. Colortron (http://www.ls.com/colortron.html)). Two typical spectra measured on the test object (sculpture) are shown in FIGS. 5A and 5B. The spectral reflectances are simple functions in this case, and one can readily define spectral bounds for red, green, and blue for which the spectral reflectances vary little from the average for the range. That is, one can define $\lambda_{C,min}$ and $\lambda_{C,max}$ and compute $\rho_{ave,C}$ in accordance with Equation (12) shown in FIG. 2.

By taking the ratio of $\rho_{ave,C}$ and $\rho_{rel,C}$ at the location in the image where the spot measurement was taken, one is enabled to estimate the scaling for light source 112a and color camera 112b spectral effects in the image. Using the scaling for each channel in the image, one can obtain at least approximate values for the absolute values of reflectance in clearly defined spectral ranges.

Once at least a few images have been adjusted to approximate reflectances in the three color channels, one can adjust all of the images for which $\rho_{rel,C}$ has been computed by requiring the colors in matching points in overlapping images to be the same. As in the case of geometric registration, it is generally inadequate to simply perform these adjustments pairwise, since small errors accumulate. The most significant errors in the relative color images have been found to arise from biases in the captured images that occur even when the automatic color compensation of the camera 112b is turned off. Some captured images are overall too blue, some too red, etc. Additional bias in the image may occur as the result of variations in the light bulbs 112a over time. To minimize the effect of these errors, it is preferred to perform a simultaneous, global color registration.

Forming equations for the color registration is facilitated by the availability of the points used in the initial geometric alignment. One result of the initial alignment is a list of points in overlapping images that represent the same location on the base geometry. One may then compute a color for each of these points by taking the average of a small neighborhood of pixels in the corrected image. A neighborhood is preferred for use rather than a point sample since very small alignment errors (e.g. of the size of one pixel projected onto the surface) can produce a very large color error when there are abrupt changes in colors between pixels. Let $\beta_{C,k}$ be the level adjustment for the $k^{th}$ corrected photometric image in the C channel. Each matching pair of points gives an equation of the form shown in Equation (13) of FIG. 2 for images m and n. There are far many more matching points than corrected images, so a least squares solution is preferred in order to compute the values of β. In Eq. (13) no level has been set for the system. While one could set the value of β to one for the image (or images) that have been adjusted with the Colortron measurements, it is desired to have the errors in the results to be distributed evenly over the model, rather than being skewed by distance from a particular image. To accomplish this, the Equation (14) shown in FIG. 2 is added to the set of equations, where N is the total number of images. Using N on the right hand side of Eq. (14) produces values of β around 1 (e.g., from about 0.6 to about 1.4). After all of the images have been adjusted to one another, global correction values for red, green and blue can be made to match the Colortron measurements.

Figure 6:
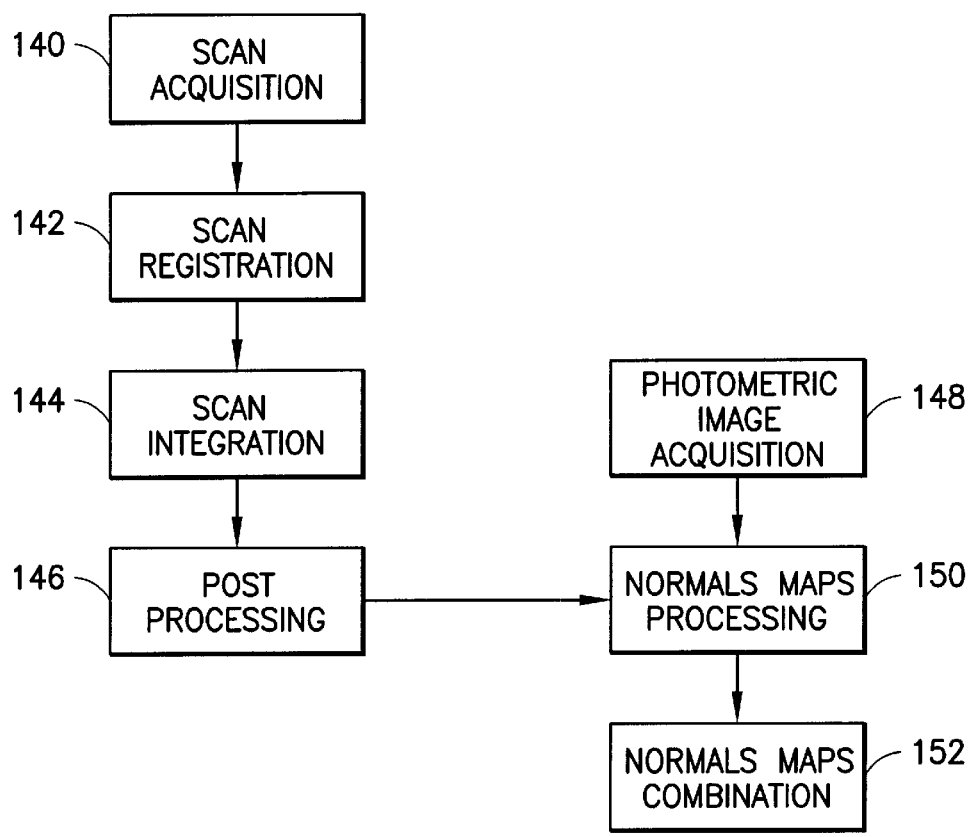
FIG. 6 is a simplified block diagram of a 3D data acquisition and reconstruction pipeline.

FIG. 6 is a simplified block diagram of a 3D data acquisition and reconstruction pipeline in accordance with these teachings, which may also be viewed as a logic flow diagram of the method disclosed herein. The image acquisition system 112 captures partial shape information in block or step 140. These scans are aligned together at step 142 to form an unorganized set of point measurements. In step 144 a mesh that connects these points into a triangular mesh is computed. A presently preferred method for forming the triangulated surface is the above-referenced Ball-Pivoting Algorithm described by F. Bernardini, Joshua Mittleman, Holly Rushmeier, Claudio Silva and Gabriel Taubin, The Ball-Pivoting Algorithm for Surface Reconstruction, IEEE Trans. on Visualization and Computer Graphics, 5(4): 349–359, October–December 1999, incorporated by reference herein in its entirety, as is the copending U.S. patent application Ser. No. 09/549,432, filed Apr. 14, 2000, entitled Method and Apparatus for Reconstructing a Surface Using a Ball-Pivoting Algorithm. However, it should be realized that the teachings of this invention are not limited to only this particular technique for forming the triangulated surface.

Further processing can occur at step 146 to transform the computed surface into one of a number of representations. In step 148 the photometric images, i.e., the images obtained from the color camera 112b are obtained with a higher spatial resolution than the mesh obtained in step 144. The mesh, or a derivative model of same produced in optional step 146, are combined to compute normals maps for representing the high spatial resolution shape of the object. Multiple normals maps are then combined to represent the complete surface of the object in step 152. The combination of normals maps can be performed in accordance with the procedure described by Fausto Bernardini, Ioana M. Martin and Holly Rushmeier, High-Quality Texture Synthesis from Multiple Scans, IBM Report RC21656, incorporated by reference herein in its entirety, as is the copending U.S. patent application Ser. No. 09/603,928, filed Jun. 27, 2000, "High Quality Texture Reconstruction from Multiple Scans", Fausto Bernardini, Ioana M. Martin and Holly Rushmeier. The teachings of this invention reside most particularly in step 150, such that when step 152 is performed there are no visible artifacts along the seams between scans.

Figure 7A:
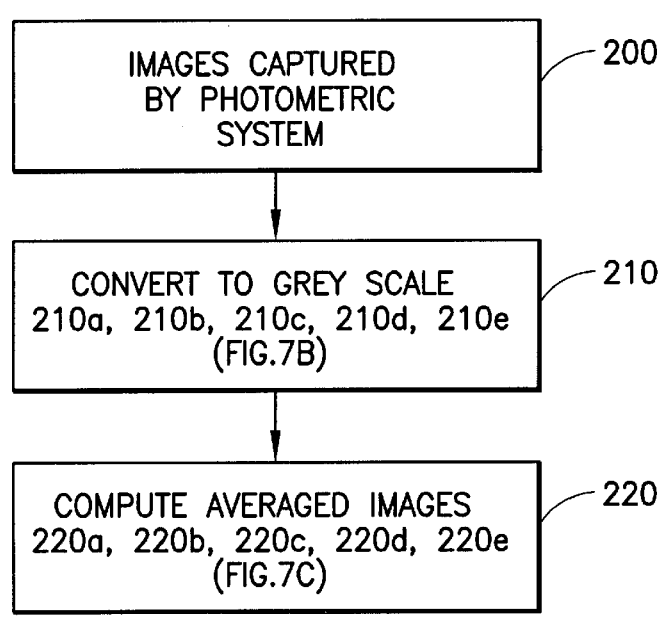
FIG. 7A is a logic flow diagram showing image capture, grey scale conversion and a computation of averaged images.
Figure 7B:
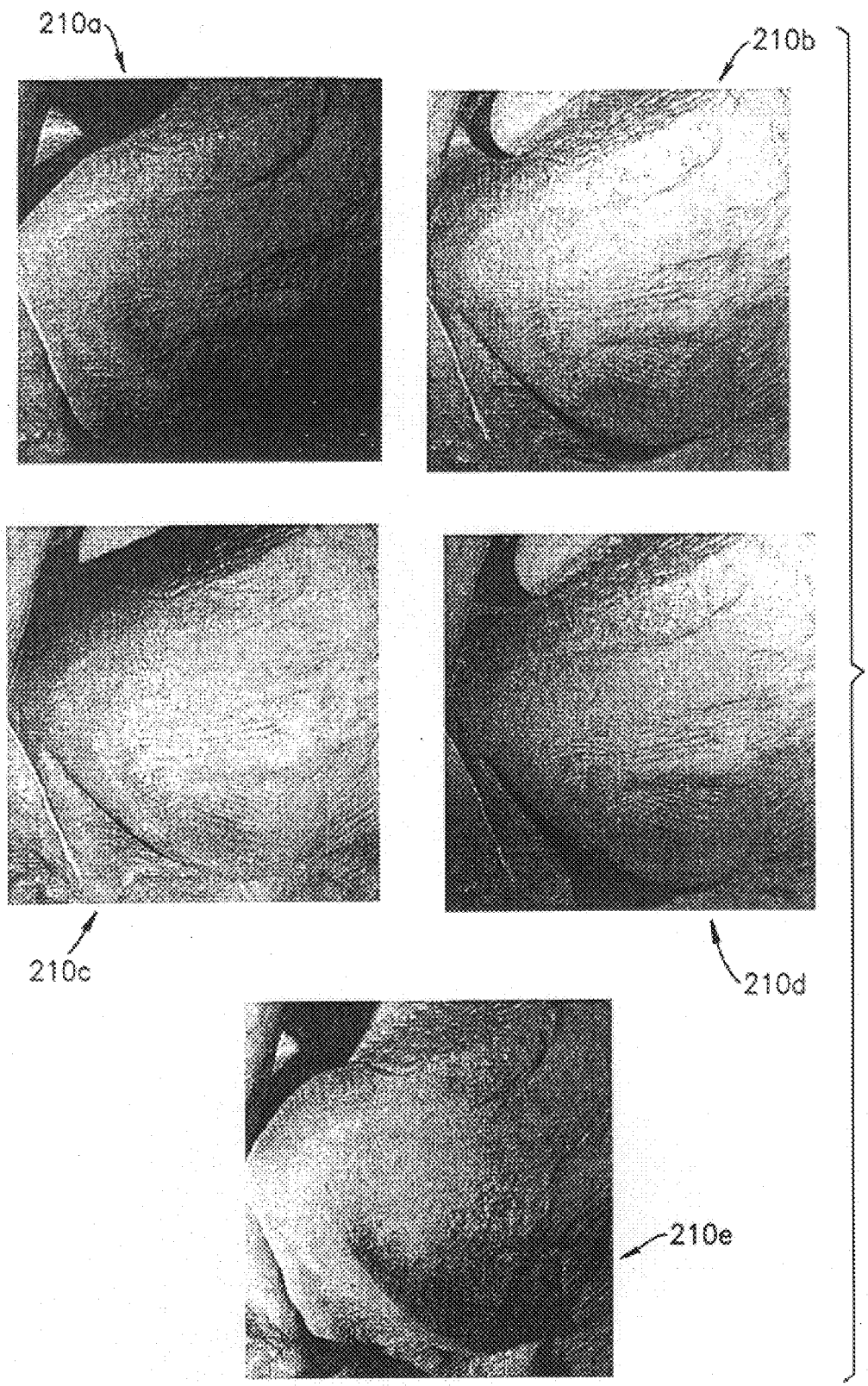
FIG. 7B shows an example of the grey scale images of FIG. 7A.
Figure 7C:
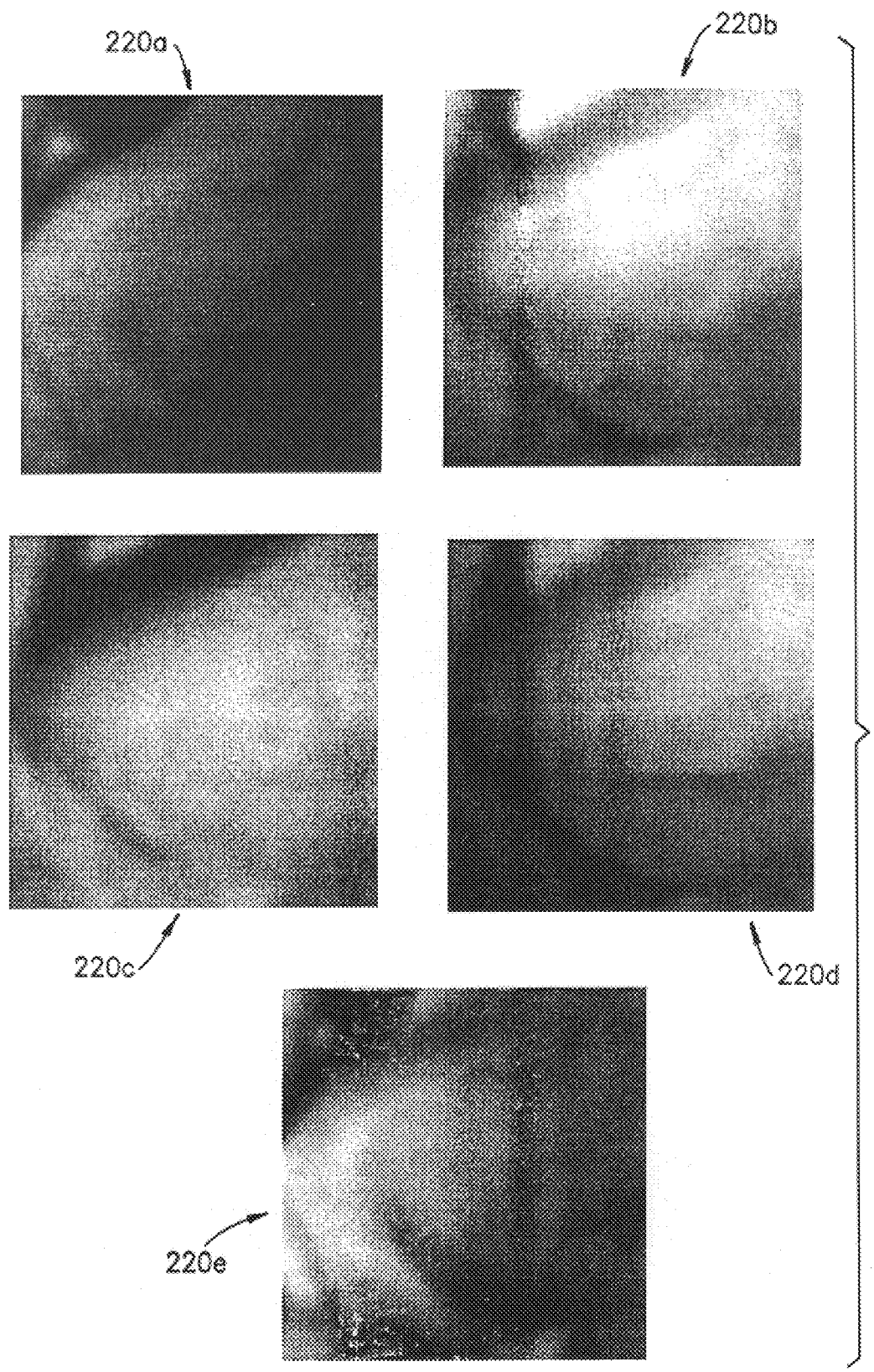
FIG. 7C shows an example of blurred images.

FIG. 7A is a logic flow diagram showing image capture, grey scale conversion and a computation of averaged images. The photometric images acquired by the color camera 112b are converted to the exemplary grey scale images 210a, 210b, 210c, 210d and 210e shown in FIG. 7B by combining the values of the red, green and blue channels of the images. Blurred versions of the images 220a, 220b, 220c, 220d and 220e shown in FIG. 7C are produced by averaging the values around each pixel that lie within the image radius corresponding to the distance between points in the low resolution mesh. In the preferred embodiment, and as was discussed above, the distance between points is 2 mm, which corresponds to a radius of five pixels.

Figure 8:
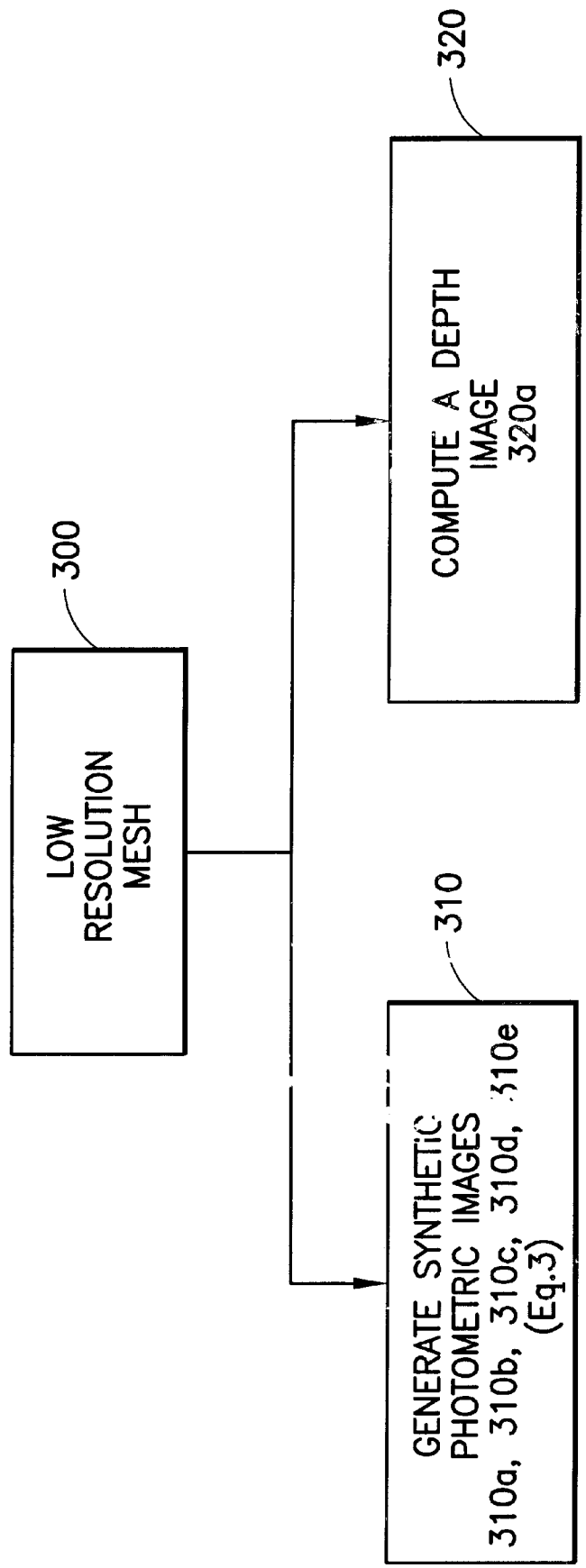
FIG. 8 is a logic flow diagram illustrating a low resolution mesh used to generate synthetic images and a depth image.

FIG. 8 is a logic flow diagram illustrating the low resolution mesh used to generate synthetic images 310a, 310b, 310c, 310d and 310e from the same color camera 112b point and light source 112a positions. Reference in this regard can be made to Eq. (3) in FIG. 2. For a given position of the color camera 112b the point visible on the low resolution mesh is identified, and the dot product of the surface normal at that point and the direction of the light source 112a is computed. The resulting value is stored in the image. An image 320a of depth values is computed at step 320 from the low resolution mesh from the same position of the camera 112b (refer to $r_{i,p}$ in relation to Eq. 5 in FIG. 2).

Figure 9A:
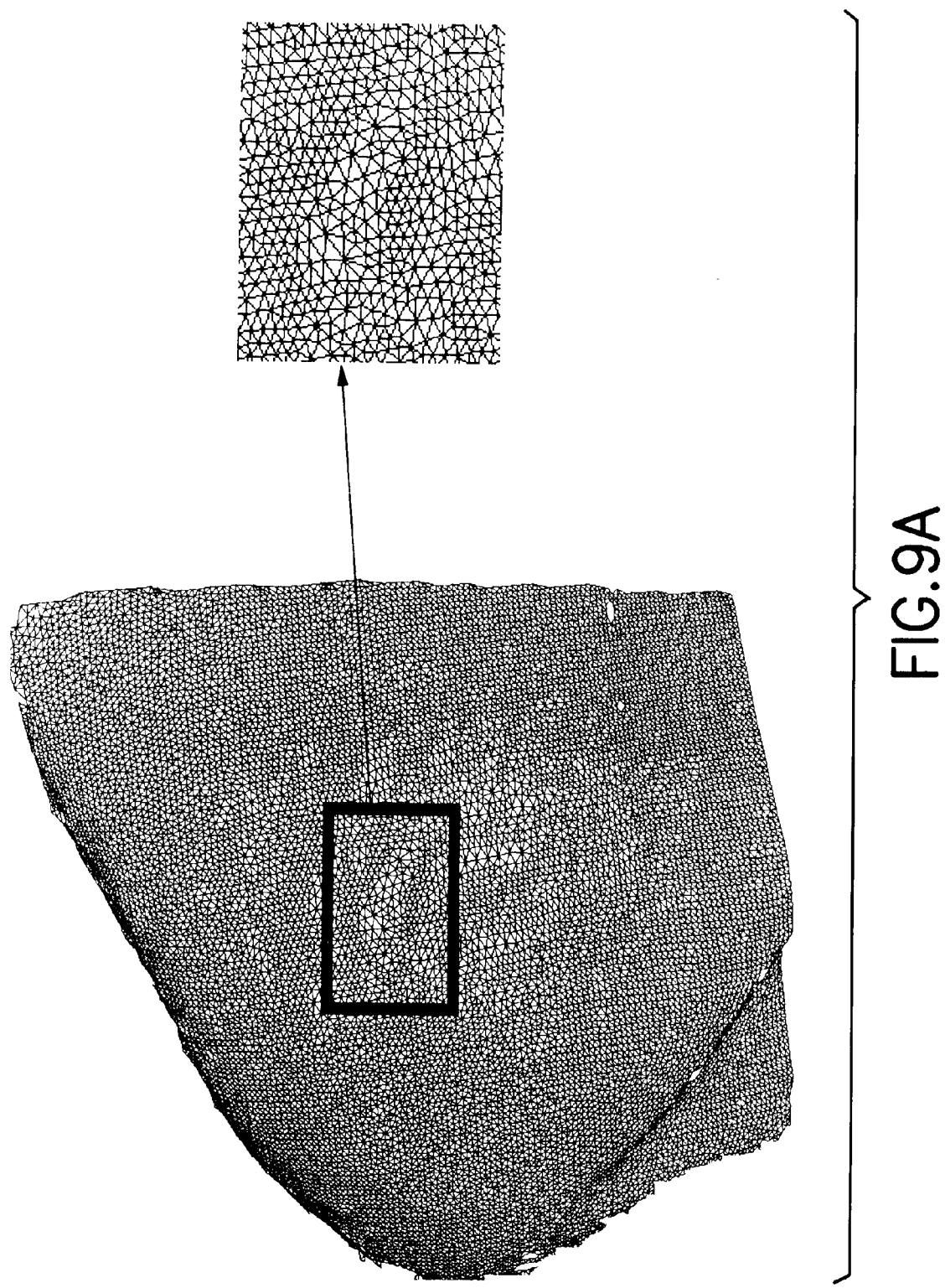
FIG. 9A depicts an exemplary low resolution mesh.
Figure 9B:
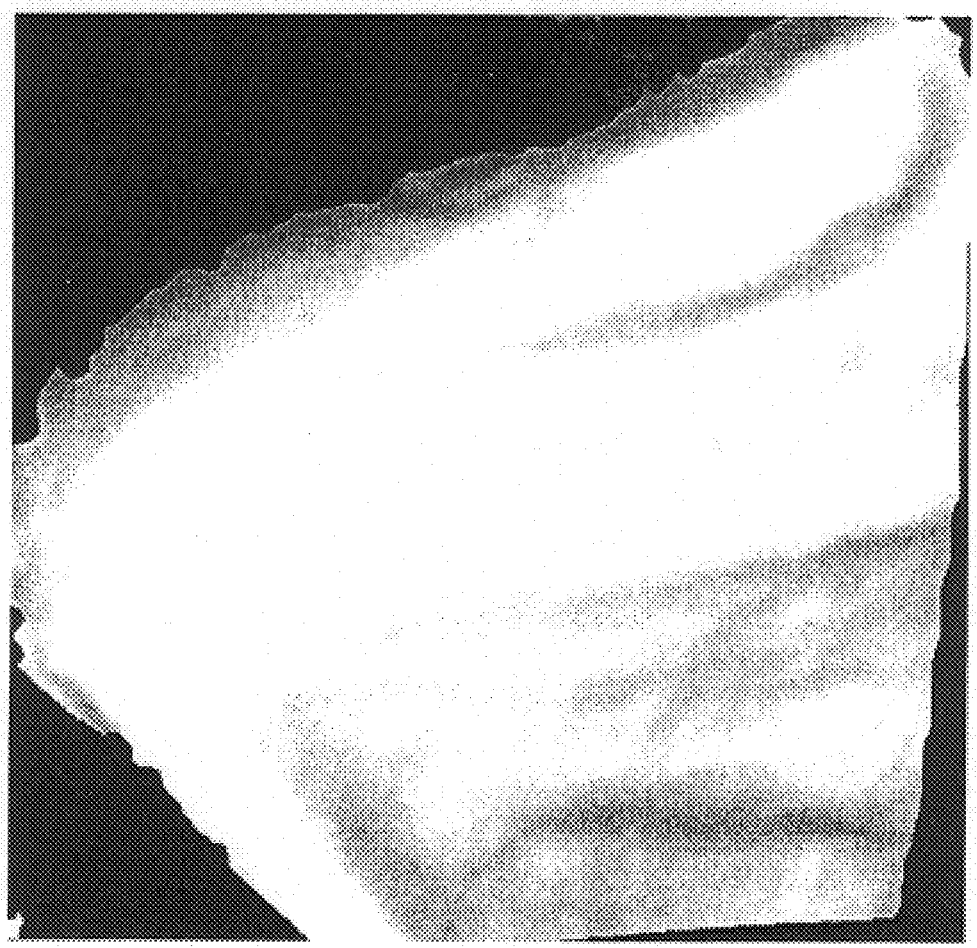
FIG. 9B depicts a synthetic image of the low resolution mesh for a specific light and camera position.

Further in this regard, FIG. 9A depicts an exemplary low resolution mesh obtained from the surface of the object being scanned, while FIG. 9B depicts a synthetic image of the low resolution mesh for a specific position of the light source 112a and color camera 112b.

Figure 10:
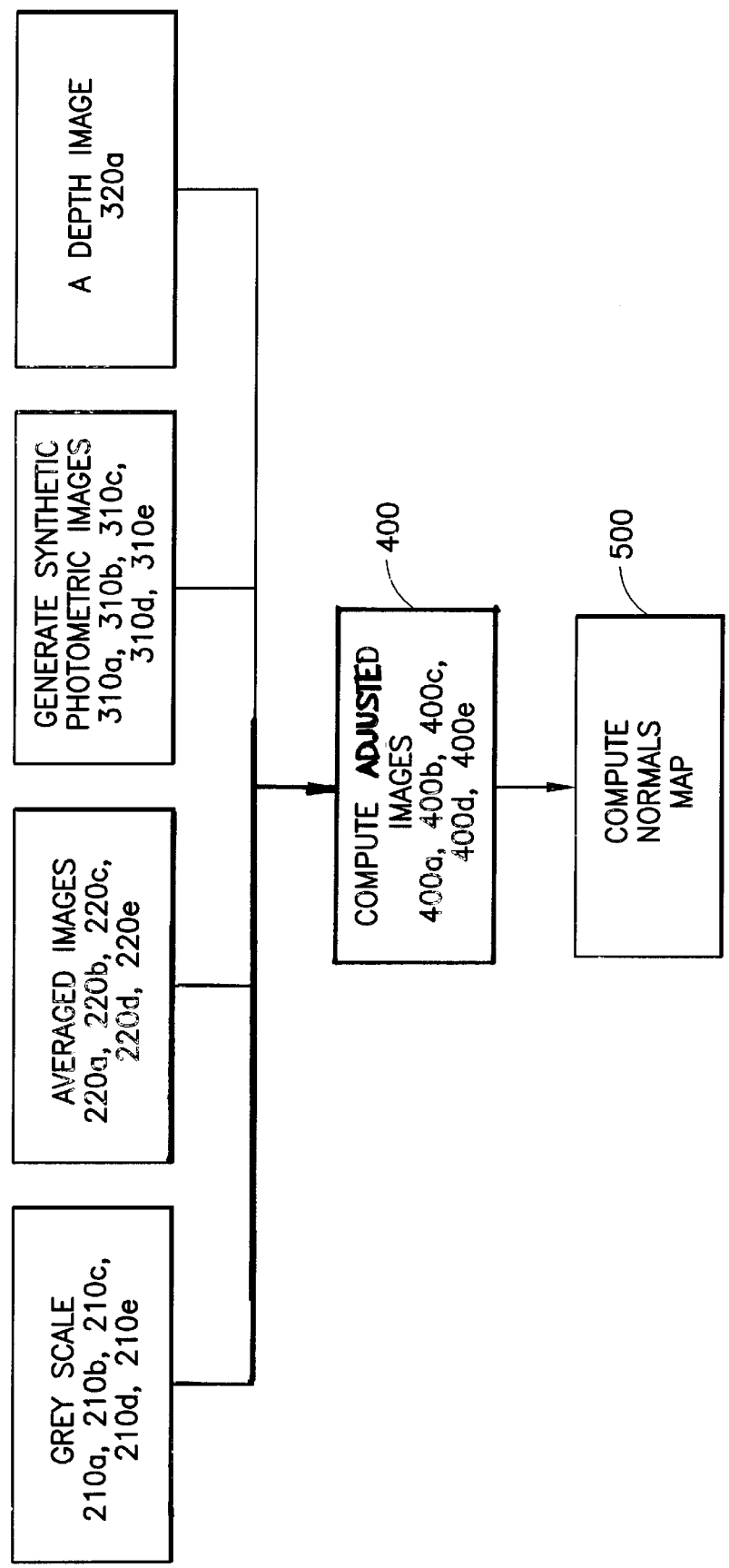
FIG. 10 is a logic flow diagram illustrating the calculation of normals maps from images derived from the photometric images and the low resolution mesh.

FIG. 10 is a logic flow diagram illustrating the calculation of normals maps from images derived from the photometric images and the low resolution mesh. For each grey scale image 210a, 210b, 210c, 210d and 210e shown in FIG. 7B an adjusted image is formed by dividing each pixel by the value at the same pixel location in the corresponding blurred image 220a, 220b, 220c, 220d and 220e shown in FIG. 7C, multiplying the value at the same pixel location in the corresponding synthetic photometric image 310a, 310b, 310c, 310d and 310e, and multiplying by the square of the value at the same pixel location in the corresponding depth image 320a (FIG. 8). The equations for these calculation are described in detail above. Using the adjusted values, the surface normals can be calculated using, for example, a method described by Holly Rushmeier, Gabriel Taubin and Andre' Gueziec, Applying Shape from Lighting Variation to Bump Map Capture, Proceedings of the Eighth Eurographics Rendering Workshop, Eds. J. Dorsey and P. Slussallek, Sainte-Etienne, France, Jun. 16–18, 1997, pp. 35–44, incorporated by reference herein in its entirety. With regard to the calculation of normals, reference can be had to the pseudo-code shown in FIG. 5 of this publication. Also incorporated by reference herein in its entirety is U.S. Pat. No. 5,974,168, Acquiring Bump Maps from Curved Objects, by Holly Rushmeier, Gabriel Taubin and Andre' Gueziec.

While the invention has been particularly shown and described with respect to preferred embodiments thereof, it will be understood by those skilled in the art that changes in form and details may be made therein without departing from the scope and spirit of the invention.

What is claimed is:

1. A system for obtaining a digital model of an object, comprising:
   a module for obtaining a base geometric model of the object in response to a plurality of scans of the object, said base geometric model having a characteristic spatial resolution; and
   a module for computing surface normals of the object with a higher spatial resolution than the spatial resolution of the base geometric model, where the surface normals are computed such that the results are consistent over the object, and also with the underlying base geometric model.

2. A method for obtaining a digital model of an object, comprising the steps of:

making a plurality of surface scans of the object under different lighting conditions and from different viewpoints;

obtaining a base geometric model of the object in response to the plurality of surface scans of the object, the base geometric model having a characteristic spatial resolution; and computing surface normals of the object with a higher spatial resolution than the spatial resolution of the base geometric model, where the surface normals are computed such that the results are consistent over the object, and also with the underlying base geometric model.

3. A method for obtaining a digital model of an object, comprising the steps of:

generating a low spatial resolution numerical representation of an object;

generating higher spatial resolution images of the object using a photometric system comprising a camera and a lighting source; and computing normals maps using the low resolution numerical representation to estimate a distance from the camera to points on the object and to adjust relative light source intensities so as to correct for uncertainties in distances and light source intensities, wherein the computed normals maps are made consistent over the object.

4. A method as in claim 3, where the step of generating a low spatial resolution numerical representation of an object generates a triangular mesh representation.

5. A method as in claim 3, wherein the step of computing normals maps comprises steps of:

forming a plurality of grey scale images from said higher spatial resolution images that are made with different light source illumination directions;

forming a corresponding plurality of blurred images from the plurality of grey scale images by an averaging technique performed within a neighborhood having an area that is a function of the resolution of the low spatial resolution numerical representation of the object;

forming an adjusted image by dividing each grey scale image pixel by a value at the same pixel location in the corresponding blurred image;

multiplying the value at the same pixel location in a corresponding plurality of synthetic photometric images;

multiplying by the square of the value at the same pixel location in a corresponding depth image to form adjusted values; and using the adjusted values, calculating surface normals to form said normals maps.

6. A computer program embodied on a computer readable medium, said computer program comprising instructions for implementing a method for obtaining a digital model of an object, the method comprising steps of:

generating a low spatial resolution numerical representation of an object;

generating higher spatial resolution images of the object using a photometric system comprising a camera and a lighting source; and computing normals maps using the low resolution numerical representation to estimate a distance from the camera to points on the object and to adjust relative light source intensities so as to correct for uncertainties in distances and light source intensities, wherein the computed normals maps are made consistent over the object.

7. A computer program as in claim 6, where the step of generating a low spatial resolution numerical representation of an object generates a triangular mesh representation.

8. A computer program as in claim 6, wherein the step of computing normals maps comprises steps of:

forming a plurality of first images from said higher spatial resolution images that are made with different light source illumination directions;

forming a corresponding plurality of second images from the plurality of first images by an averaging technique performed within a neighborhood having an area that is a function of the resolution of the low spatial resolution numerical representation of the object;

forming an adjusted image by dividing individual ones of first image pixels by a value at the same pixel location in the corresponding second image;

multiplying the value at the same pixel location in a corresponding plurality of synthetic photometric images;

multiplying by the square of the value at the same pixel location in a corresponding depth image to form adjusted values; and using the adjusted values, calculating surface normals to form said normals maps.

* * * * *